(12) United States Patent
Miller (10) Patent No.: US 8,887,367 B2
(45) Date of Patent: Nov. 18, 2014

(54) CELL INCLUDING CLEAN AND DIRTY SECTIONS FOR FABRICATING COMPOSITE PARTS

(75) Inventor: Jeffrey L. Miller, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 660 days.

(21) Appl. No.: 13/267,876

(22) Filed: Oct. 6, 2011

(65) Prior Publication Data
US 2013/0014378 A1 Jan. 17, 2013

Related U.S. Application Data

(60) Provisional application No. 61/507,115, filed on Jul. 12, 2011.

(51) Int. Cl.
| | |
|---|---|
| *B21D 39/20* | (2006.01) |
| *B29C 73/04* | (2006.01) |
| *B29C 70/30* | (2006.01) |
| *B29C 70/32* | (2006.01) |
| *B29C 70/00* | (2006.01) |
| *B29C 35/02* | (2006.01) |

(52) U.S. Cl.
CPC .................. *B29C 73/04* (2013.01); *B29C 70/30* (2013.01); *B29C 70/32* (2013.01); *B29C 70/00* (2013.01); *B29C 35/02* (2013.01); *B29C 35/0227* (2013.01)
USPC ............................. 29/419.1; 29/557; 156/185

(58) Field of Classification Search
CPC ........ B25B 11/02; B29C 70/30; B29C 70/32; B29C 70/38; B29C 2791/005
USPC ......... 29/419.1, 468, 557, 559; 156/185, 194, 156/429

See application file for complete search history.

(56) References Cited

U.S. PATENT DOCUMENTS

| | | |
|---|---|---|
| 5,341,918 A | 8/1994 | Covert |
| 7,103,952 B2 * | 9/2006 | Appleton et al. ............ 29/281.4 |
| 2006/0180264 A1 | 8/2006 | Kisch |

FOREIGN PATENT DOCUMENTS

GB 2115594 B 9/2013

OTHER PUBLICATIONS

Vermont Composites, "Manufacturing Capabilities," http://www.vtcomposites.com/Vermont_Composites_Capabilities/Manufacturing_Capabilities.aspx.

* cited by examiner

*Primary Examiner* — Jermie Cozart
(74) *Attorney, Agent, or Firm* — Hugh P. Gortler (57) ABSTRACT

A cell for fabricating a part having reinforcing fibers embedded in a matrix, includes a clean section for performing clean operations including laying up the reinforcing fibers on a mandrel tool. The clean section satisfies clean room requirements for processing uncured composite materials. The cell further includes an adjacent dirty section for performing dirty operations including machining the layup after curing; a common end effector positioning system movable between the clean and dirty sections; and means for preventing contaminants in the dirty section from entering the clean section.

19 Claims, 6 Drawing Sheets

CELL INCLUDING CLEAN AND DIRTY SECTIONS FOR FABRICATING COMPOSITE PARTS

This application claims the benefit of provisional application 61/507,115 filed Jul. 12, 2011.

BACKGROUND

Commercial aircraft may be damaged by bird strikes, ground handling equipment, debris, hail and other unplanned events. These events can create holes and tears in aircraft skin, and damage to underlying stiffening substructure (e.g., frames, stiffeners and pad-ups). For instance, an aircraft's nose cab section may be damaged by a bird strike, a lower lobe may be damaged due to nose gear collapse, mid-section door surrounds may be damaged due to collisions with ground handling equipment, an end section lower lobe may be damaged by a tail strike, etc.

It is important to repair a damaged aircraft and return it to service as quickly as possible. Down time is very costly to an aircraft carrier, as an idle aircraft results in lost revenue.

Repair of a panelized aluminum aircraft is relatively straightforward. A damaged panel and underlying substructure are removed from the aircraft and replaced. If panels are available, the repair can be implemented relatively quickly.

Repair of composite commercial aircraft is not so straightforward, especially for large area repair of one a piece component. Consider a fuselage made up of several one-piece composite barrel sections. Each barrel section includes skin, hoop frames, and stiffeners (e.g., stringers). The stiffeners may be integrated with the skin (by co-curing during fabrication). The hoop frames may be mechanically fastened to the skin. If a large area of a fuselage section becomes damaged, removing and replacing the entire barrel section would be prohibitively expensive, disruptive to production, and time consuming.

An infrastructure for large area repair of one-piece composite aircraft components is needed.

SUMMARY

According to an embodiment herein, a cell for fabricating a part having reinforcing fibers embedded in a matrix includes a clean section for performing clean operations including laying up the reinforcing fibers on a mandrel tool. The clean section satisfies clean room requirements for processing uncured composite materials. The cell further includes an adjacent dirty section for performing dirty operations including machining the layup after curing; a common end effector positioning system movable between the clean and dirty sections; and means for preventing contaminants in the dirty section from entering the clean section.

According to another embodiment herein, a fabrication cell includes a clean section dedicated to laying up reinforcing fibers on a mandrel tool, an adjacent dirty section dedicated to machining the layup after curing, and a common end effector positioning system that is movable between the clean and dirty sections.

According to another embodiment herein, a fabrication cell includes a clean section including interchangeable end effectors for performing composite layup operations. The clean section satisfies clean room requirements for processing uncured composite materials. The fabrication cell further includes a dirty section adjacent the clean section, the dirty section including interchangeable end effectors for performing machining operations; and an end effector positioning system, movable between the clean and dirty sections, for selecting and using the end effectors to perform the layup operations in the clean section and the machining operations in the dirty section.

DETAILED DESCRIPTION

Figure 1:
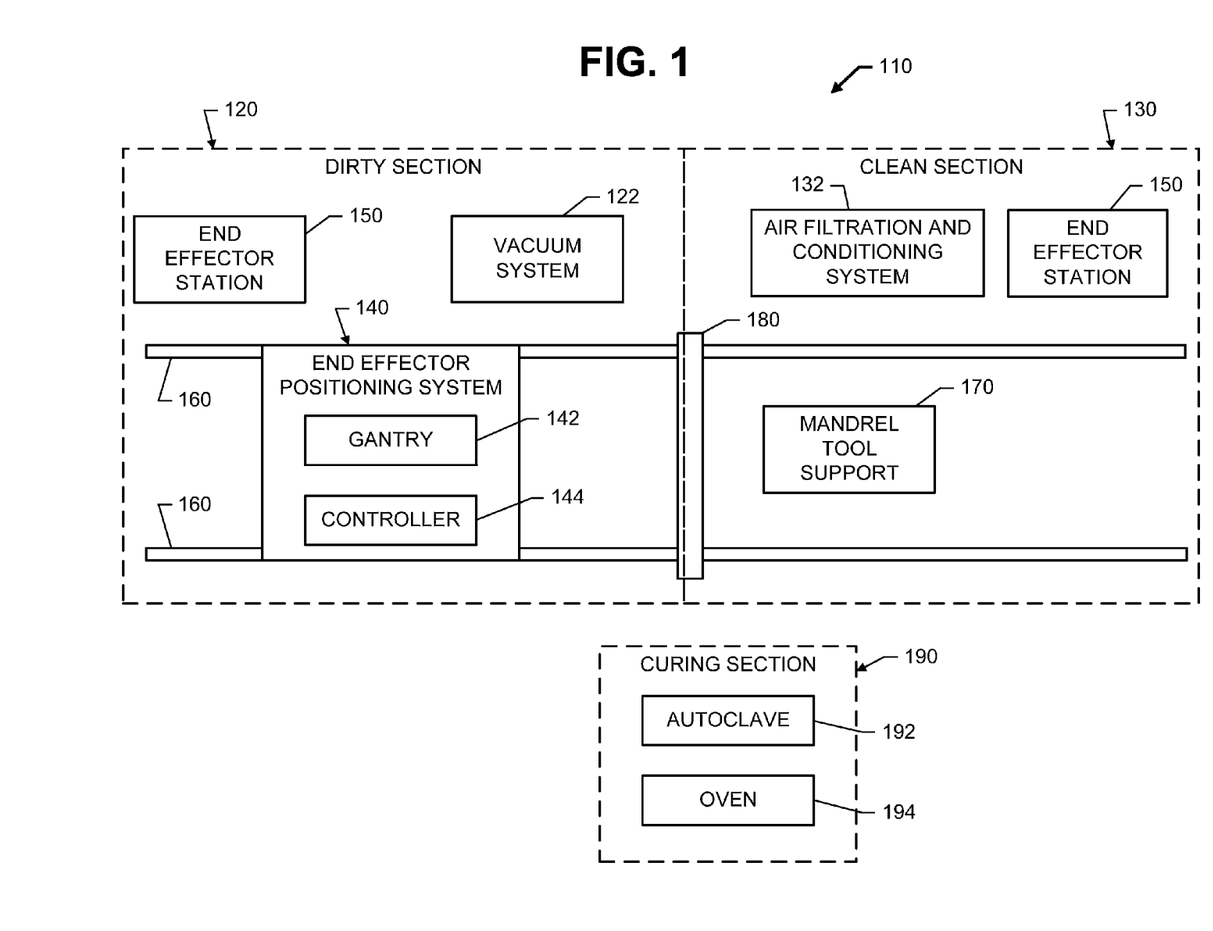
FIG. 1 is an illustration of a fabrication cell having adjacent clean and dirty sections.

Reference is made to FIG. 1, which illustrates a fabrication cell 110 for manufacturing a composite part including layers or plies of reinforcing fibers embedded in a matrix. One example of a composite is carbon fiber reinforced plastic (CFRP), where the constituents may include carbon fibers embedded in an epoxy matrix.

The fabrication cell 110 includes a dirty section 120 and a clean section 130. Operations in the dirty section 120 include, but are not limited to, assembly and machining (e.g., trimming, milling and drilling). Operations are considered dirty if they can produce dust or contaminants that violate clean room requirements for the processing of uncured composite materials. For "dirty" operations such as machining, the dirty section 120 may include a vacuum system 122 for minimizing dust and debris to facilitate cleaning. The vacuum system 122 may have up to 98% or greater effectiveness from removing dust.

Operations in the clean section 130 include composite layup on a mandrel tool. In some embodiments, fibers may be deposited on a layup mandrel tool that is static. In other embodiments, fibers may be deposited on a layup mandrel tool while the tool is being rotated.

Operations in the clean section 130 further include caul plate installation, bagging, and material cutting. For instance, fabric for resin infusion or pre-impregnation could be cut by an ultrasonic knife or other device, such as a ply cutter or a hand tool. Resin infusion may also be performed in the clean section 130.

Operations are considered clean if they do not violate clean room requirements and require being performed in a clean room due to contamination concerns (e.g., processes that involve handling uncured composite materials). The clean section 130 may include an air filtration and conditioning system 132 for maintaining environmental conditions within specification. Generally, composite facilities require 400,000 class clean rooms with temperature, humidity, and particle count monitored. The equipment and tooling should satisfy these requirements when moved from the dirty section 120 to the clean section 130. Should the clean section 130 fall out specification, wait time may be required for air circulation filters of the system 132 to remove dust from the air.

The fabrication cell 110 includes a common end effector positioning system 140, movable between the dirty and clean sections 120 and 130, for performing all of these clean and dirty operations. The end effector positioning system 140 may use a plurality of interchangeable end effectors for performing the operations. The end effectors may be located at end effector stations 150 located in the dirty and clean sections 120 and 130. A manual, automatic, or semi automatic changer may be used to change end effectors in both dirty and clean sections 120 and 130.

The end effectors may include tools for machining (e.g., milling, drilling), tools for trimming, a lamination head for tape or slit tape tow laydown of the panel or face sheet, a paint spray head for painting, an ultrasonic cutter for cutting prepreg or dry material, an NDI head (with necessary shoes) for ultrasonic inspection of the composite part, a stringer roll former for forming composite parts, a material dispenser, and inspection probes for geometric and dimensional inspection of the composite part.

In some embodiments, the end effector positioning system 140 may include a single positioning machine such as a gantry 142 having multiple axes of motion (e.g., up to seven axes). In other embodiments, the positioning system 140 may include a robot or multiple robots for performing the clean and dirty operations. A single robot may have interchangeable end effectors. Multiple robots may use combinations of dedicated end effectors. Other types of end effector positioning systems may include combinations of linear Cartesian axis platforms, rotary axis platforms, and Stewart platforms using parallel kinematics. Specific examples include gantries, robots, robots-on-rail, post-mill type platforms, and Stewart platforms (e.g. hexapods). In each of these examples, the end effector positioning system 140 is configured to deliver a selected end effector to a position or along a path to perform its function, while satisfying performance requirements (e.g., angles, velocity, acceleration, stiffness, range of travel, utilities, quick-release coupling).

The end effector positioning system 140 is movable between the dirty and clean sections 120 and 130. In some embodiments, the end effector positioning system 140 may be moved by a machine rail system 160. In other embodiments, the end effector positioning system 140 may be moved via air bearings or wheels, and then locally positioned.

A mandrel tool support 170 is provided to support the mandrel tool during layup. In some embodiments, the mandrel tool support may include a table that is moveable between dirty and clean sections 120 and 130. The table may be positionable between machine legs of the gantry 142.

The end effector positioning system 140 may be covered with sheet metal or other material that provides a smooth surface for cleaning. The end effector positioning system 140 may also utilize polyethylene type plastic as a protective covering. Such plastic may be easily removed for cleaning before transferring the gantry 142 from the dirty section 120 to the clean section 130. This all helps to maintain clean room requirements.

In some embodiments, a barrier 180 such as a fast door, strip door or freezer door separates the dirty and clean sections 120 and 130. These doors are designed to maintain environmental controls between areas with different conditions. The clean section 130 may be positive pressurized to keep out dust and other contaminants.

In some embodiments, the barrier 180 may include an airlock, which may be fixed or portable. The airlock may include of a chamber with two airtight doors in series which do not open simultaneously. In general, an airlock permits the passage of people and objects between a pressure vessel and its surroundings while minimizing the change of pressure in the vessel and loss of air from it. An airlock having an accordion design may include a portable sealed chamber that covers the end effector positioning system 140 as it transitions between the sections 120 and 130 to keep any contaminants out of the clean section 130.

For movement from the clean section 130 to the dirty section 120, the clean section door is opened, the end-effector positioning system 140 (which is already clean) is moved into the airlock, the clean section door is shut, the dirty section door is opened, and the end effector positioning system 140 is moved into the dirty section 120. The dirty section door is then shut. For movement from the dirty section 120 to the clean section 130, the dirty section door is opened, the end-effector positioning system 140 (which is already dirty) is moved into the airlock, and the dirty section door is closed (the clean section door is already closed). The end effector positioning system 140 is cleaned (e.g., protective coverings are stripped off, and the system is wiped down). After the environment inside the airlock is validated as clean, the clean section door is opened, and the end effector positioning system 140 is moved into the clean section 130.

The fabrication cell 110 may also include a nearby curing section 190 for curing of the composite part. In some embodiments, the curing section 190 may include an autoclave 192 for curing prepregs under heat and pressure. In other embodiments, the curing section 190 may include an oven 194 for curing resin-infused fabric under heat or prepreg material designed for out-of-autoclave processing.

The curing section 190 is preferably adjacent to the clean section 130. Close proximity simplifies handling logistics. The composite part may be shuttled to the autoclave on heat suitable castors or wheels on the underside of the mandrel tool or on a dolly designed to withstand autoclave cure.

Nondestructive inspection of the cured composite part may be performed in the dirty section 120, provided that dust does not interfere with the non destructive inspection operation. Nondestructive inspection may be performed in the clean section 130, provided that the coupling (e.g. water) is controlled so as not to violate clean room requirements.

The end effector positioning system 140 may also include a common controller 144 for moving the end effector positioning system 140 (e.g., gantry 142) along the rail system 160 and commanding the end effector positioning system 140 to perform the clean and dirty operations. The controller 144 may be fed programs from a programming and simulation tool. This programming and simulation tool may be designed to provide the necessary instructions for all end-effector types used within the fabrication cell 110.

The fabrication cell 110 may be used to fabricate more than the composite part. It may also be used to fabricate the mandrel tool upon which the composite part is formed. The fabrication cell 110 may be equipped with end effectors for fabricating layup mandrel tools. As a first example, the fabrication cell 110 may be equipped with end effectors for producing a master tool (e.g. composite), which in turn can be used to cast composite production tools. As a second example, the fabrication cell 110 may be equipped with end effectors having milling and drilling capabilities for producing a metal layup tool.

Figure 2:
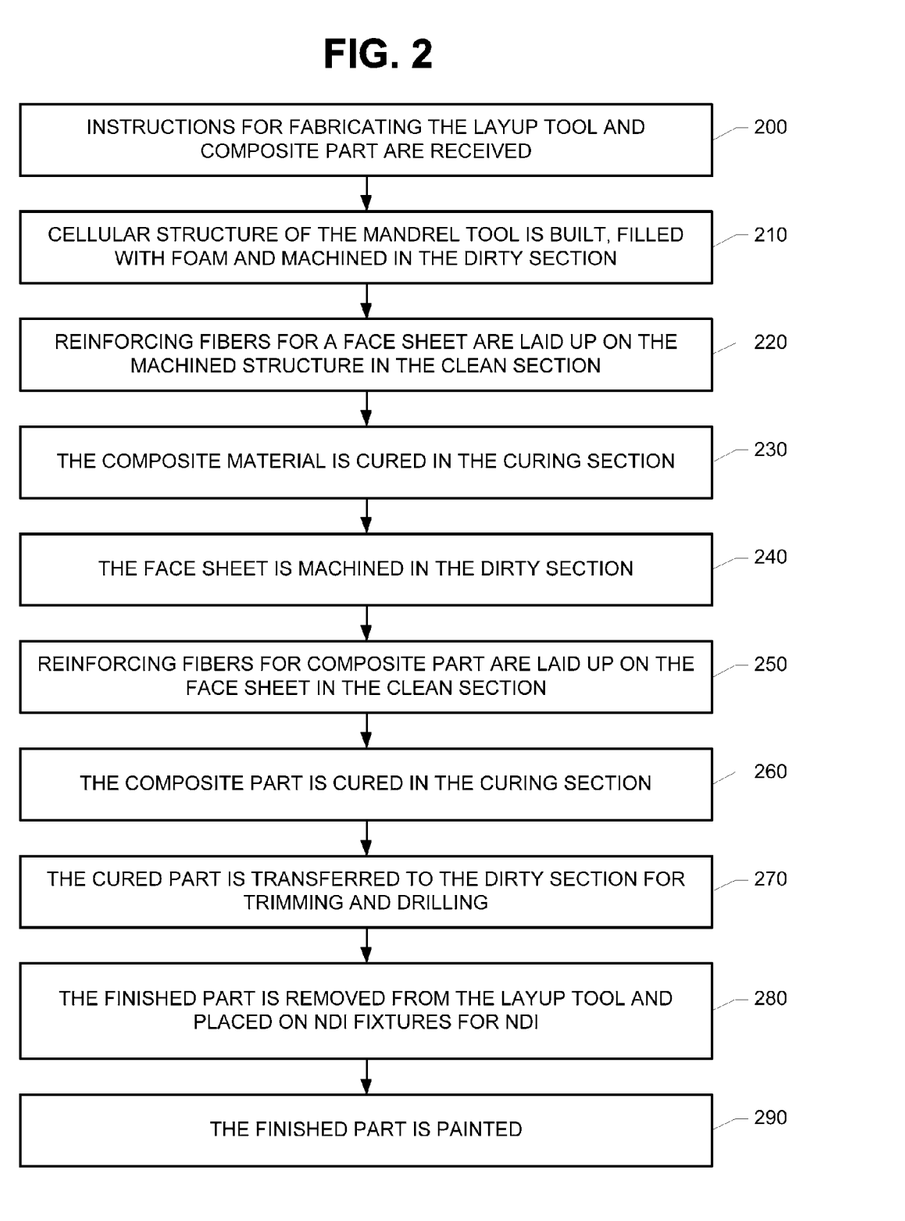
FIG. 2 is an illustration of a method of using the fabrication cell to fabricate a layup mandrel tool and composite part.
Figure 7:
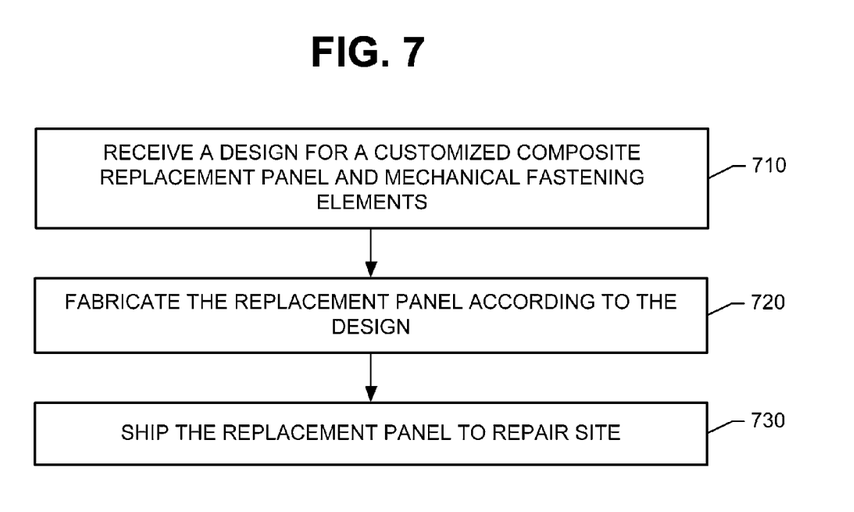
FIG. 7 is an illustration of a method for repairing a damaged one-piece composite component of an aircraft, including design and fabrication of a composite replacement panel.

Reference is now made to FIG. 2, which illustrates a method of using the fabrication cell 110 to fabricate both a layup mandrel tool and a composite part. In FIG. 2, a particular type of layup tool is fabricated: a masterless tool including a cellular structure filled with foam and covered with a composite face sheet, which provides an aero-smooth layup surface. In FIG. 7, the composite part is not limited to any particular type or application. It may be a production part, a replacement panel, a fastening element (e.g., a doubler), etc. The composite part may be for a vehicle (e.g., aircraft, space, boat, car, truck), a wind generator (e.g., a blade), or a civil engineering structure (e.g., a bridge element for reinforcement).

At block 200, the controller 144 receives instructions for fabricating the tool and part. The instructions provide the commands for the end effector positioning system 140 to select end effectors and use the selected end effectors to perform their desired functions. For a hole drilling end-effector, the instructions may include position and angle of the drill, feed rate, rotation speed, and drill cycle instructions. For milling of a tool or edge trimming of a part, the milling end-effector instructions may include the path for the cutter, angular position, rotation speed, and feed rate. For a fiber placement end effector, the instructions may include the path for the head, angular position, and cut and add commands for the different tows. The instructions may be produced by a programming and simulation module, which is designed for the fabrication cell 110. The programming and simulation module derives the instructions from engineering models associated with the composite part and tool. The models identify surface geometry and features such as holes, trim locations, and ply boundaries. The engineering models define the part and tool requirements. The programming and simulation module takes these requirements from the engineering models and converts them into instructions that can be processed by the fabrication cell 110. The controller 144 then executes the instructions to perform the following.

At block 210, a cellular structure of the layup mandrel tool is built in the dirty section 120. The layup mandrel tool may be built with composite header boards, which may be cut with a water jet cutting tool or a router tool. In some embodiments, the header boards may be assembled on and secured to a moveable table, whereby the moveable table "becomes" part of the mandrel tool.

The resulting cellular structure is assembled and filled with foam, using dispensed and mixed liquid, blocks of pre-cast material, or a combination thereof. For instance, the end effector positioning system 140 selects a foam material dispenser or a handling end effector from the end effector station 150. The dispenser is selected for tooling foam application such as a 2-part polyisocyanurate system. The handling end effector is selected to place pre-cured foam tooling blocks in the tool header boards.

Following build up, the end effector positioning system 140 selects a milling end effector from the end effector station 150, loads the milling end effector, and machines the foam and header board. The end effector positioning system 140 then selects and loads a probe head, and uses the probe head for location verification or inspection to validate geometry.

At block 220, reinforcing fibers for a face sheet is laid up on the machined cellular structure in the clean section 130. In some embodiments, fabric may be dispensed by a fabric dispensing end effector, and the dispensed fabric may be cut by an ultrasonic cutting knife end effector. The fabric may be deposited by an end effector that performs automated fiber placement (AFP) or automated tape layer (ATL). In other embodiments, the layup may be performed manually.

At block 230, the composite material is cured in the curing section 190. A resin-infused layup is cured in the oven, or a prepreg layup is cured in the autoclave, or an out-of-autoclave system is cured in an oven. Resin infusion may include a post-cure at approximately 350° F. for epoxy materials, and higher for BMI materials. Prior to post-curing, the foam-like material may be removed from the mandrel tool, especially for tools having taller header boards.

At block 240, the face sheet is machined in the dirty section 120. Any necessary hand finish is also performed in the dirty section. Appropriate vacuum is utilized for dust collection. Sealing of the tool may also be performed using an automated end effector (spray of roller) or manual process. A finished layup mandrel tool is then cleaned and transferred to the clean section for panel layup.

At block 250, composite material for the composite part is laid up on the mandrel tool in the clean section. The part layup may be performed automatically by the end effector positioning system 140 (for example, with an end effector that performs AFP or ATL) or the panel layup may be performed manually.

Caul plates may then be placed on the part layup (depending on finish requirements). The part layup is then bagged, and moved to the curing section.

At block 260, the composite part is cured in the curing section 190. At block 270, the cured part is transferred to the dirty section 120, where trimming and drilling are performed.

At block 280, following trimming and drilling, the finished part is removed from the layup tool. A relatively large part may be removed with a lifting fixture. The finished part is placed on an NDI fixture to enable ultrasonic inspection. The end effector positioning system 140 may perform NDI by selecting NDI end effectors (shoes) that are applicable for the part geometry.

At block 290, following NDI, the part is moved to the dirty section, where it is painted (in other embodiments, the painting may be performed in a separate facility). The gantry may use a painting end effector. Some additional ventilation (portable ducts, etc.) may be provided to facilitate painting in the dirty section.

The layup mandrel tool and the end effector positioning system 140 are cleaned prior to moving from the dirty section 120 to the clean section 130. If foam or carbon fiber are cut, a high performance vacuum collection system 122 may be deployed to minimize dust, possibly with some coolant to keep airborne particles to a minimum.

A fabrication cell 110 herein offers advantages over conventional fabrication facilities. End effector positioning systems tend to be very expensive, so capital expenditure on equipment is reduced significantly by using a common end effector positioning system instead of dedicated systems for different functions.

A fabrication cell herein can fabricate parts faster than facilities that perform clean and dirty operations in a single section. The only element that needs to be cleaned between clean and dirty operations is the end effector positioning system 140. Time is not spent waiting for particle counts to settle before clean operations are performed.

A fabrication cell herein has a relatively small footprint. Consider an example of a fabrication cell for fabricating parts as large as 45 feet long, 20 feet wide, and 12 feet tall. Such a cell may have a floor area of about 5,000 square feet and a ceiling height of about 25 feet. The floor of the fabrication cell may be flat, with a foundation sufficient for the weight and loading of the end effector positioning system 140. The relatively small footprint enables multiple fabrication cells to be constructed at different locations instead of a single large cell being constructed at a large central facility.

These advantages will be especially useful for repairing of a new class of commercial aircraft. This new class of aircraft includes large one-piece sections made of composite material.

Figure 3:
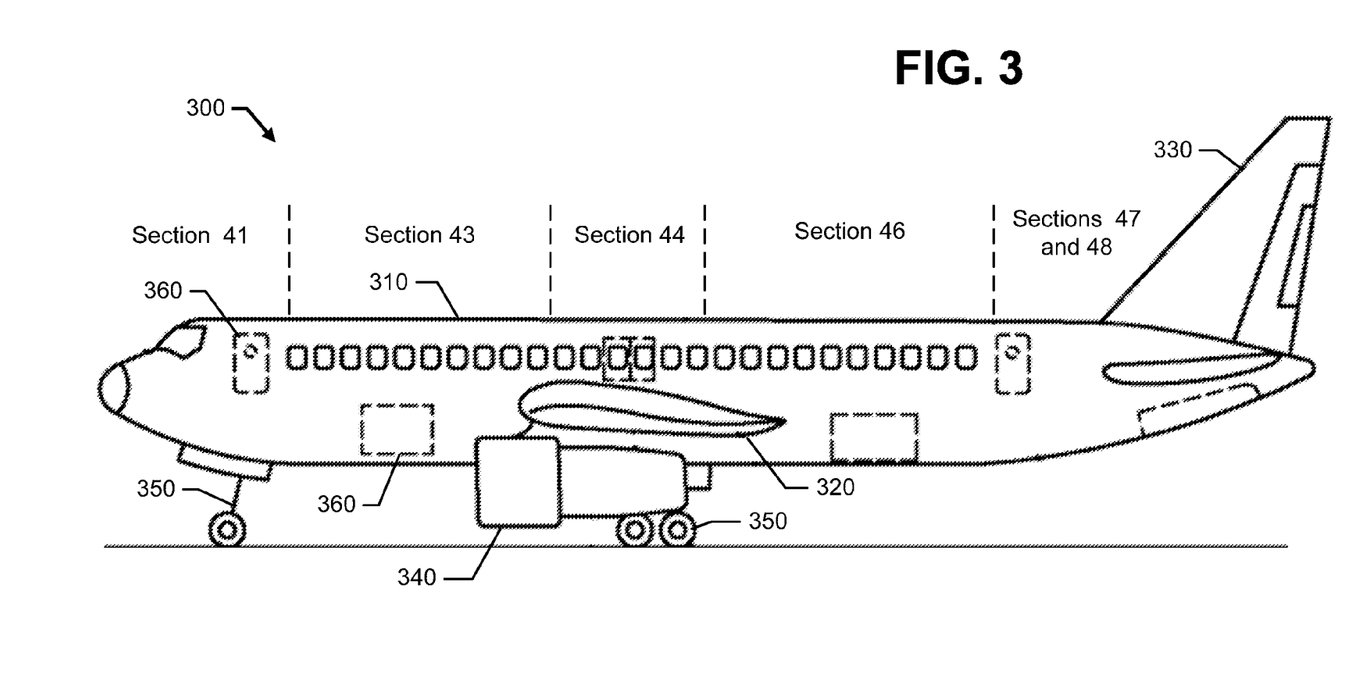
FIG. 3 is an illustration of an aircraft including a composite fuselage.

Reference is made to FIG. 3, which illustrates an example of a composite aircraft 300. The aircraft 300 generally includes a fuselage 310, wing assemblies 320, and empennage 330. One or more propulsion units 340 are coupled to the fuselage 310, wing assemblies 320 or other portions of the aircraft 300. Landing gear assemblies 350 are coupled to the fuselage 310.

In some embodiments, the entire fuselage 310 may be made of a single one-piece composite section. In other embodiments, the fuselage 310 may be formed by multiple one-piece composite sections. In the example illustrated in FIG. 3, the fuselage 310 is formed from the following one-piece composite barrel sections: a nose cab section (section 41), three mid sections (sections 43, 44 and 46), and end sections (section 47 and 48).

Passenger and cargo doors 360 are formed in five sections. Thus, all sections are susceptible to damage from ground handling equipment. All sections are also susceptible to damage from ground debris. The nose cab section is also susceptible to damage from bird strikes, which are high energy impacts. A lower lobe of the nose cab section is susceptible to damage due to nose gear collapse. A lower lobe of the end section is susceptible to damage by tail strikes.

In a large commercial aircraft, it is far more desirable to replace the damaged area than replace an entire one-piece barrel. Still, the damaged area will usually be random. That is, the location, exact size, and extent of the damage may vary from incident to incident. Consequently, a pre-fabricated panel might not fit well, or at all, into a damaged area. Advantageously, a fabrication cell herein may be used to fabricate tool and panels that are customized to replace the damaged areas.

A fabrication cell herein may also be used to produce composite production parts and tools for the parts. Examples of production parts include, but are not limited to, nacelles, wing ribs, center box structures, and door structures.

Figure 4:
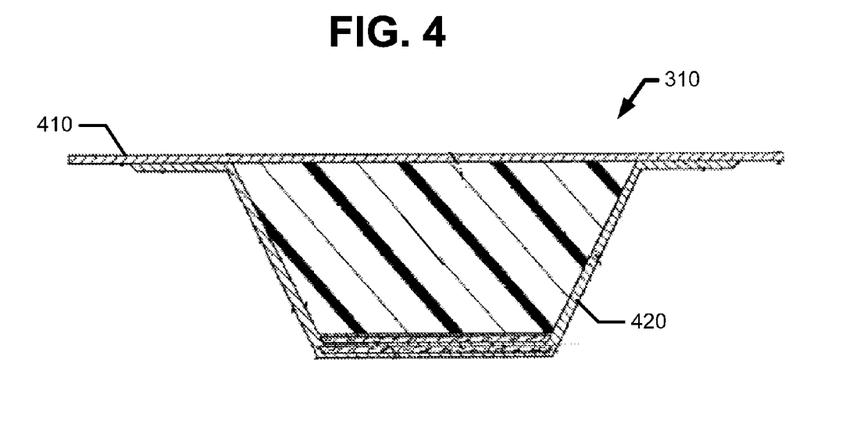
FIG. 4 is an illustration of skin and underlying stiffening substructure of a composite barrel section of the fuselage.
Figure 5:
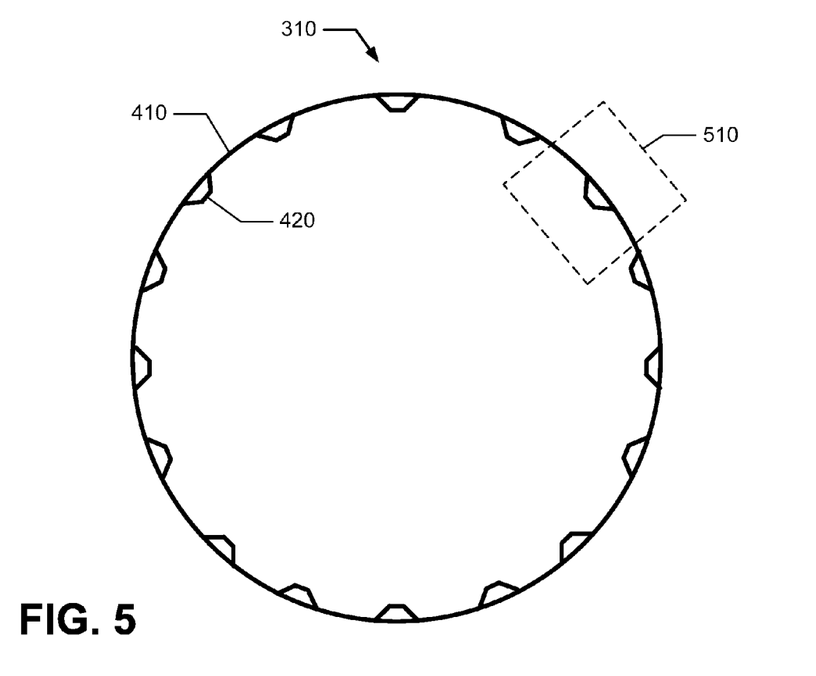
FIG. 5 is an illustration of a damaged area of a one-piece fuselage barrel.

Reference is now made to FIGS. 4 and 5, which illustrate a randomly damaged area 510 of the fuselage 310. In addition to damage to the skin 410, the underlying integrated stiffening substructure 420 may also be damaged. The stiffening substructure may include longitudinally-extending stringers 420, which are co-cured with the skin 410.

Figure 6:
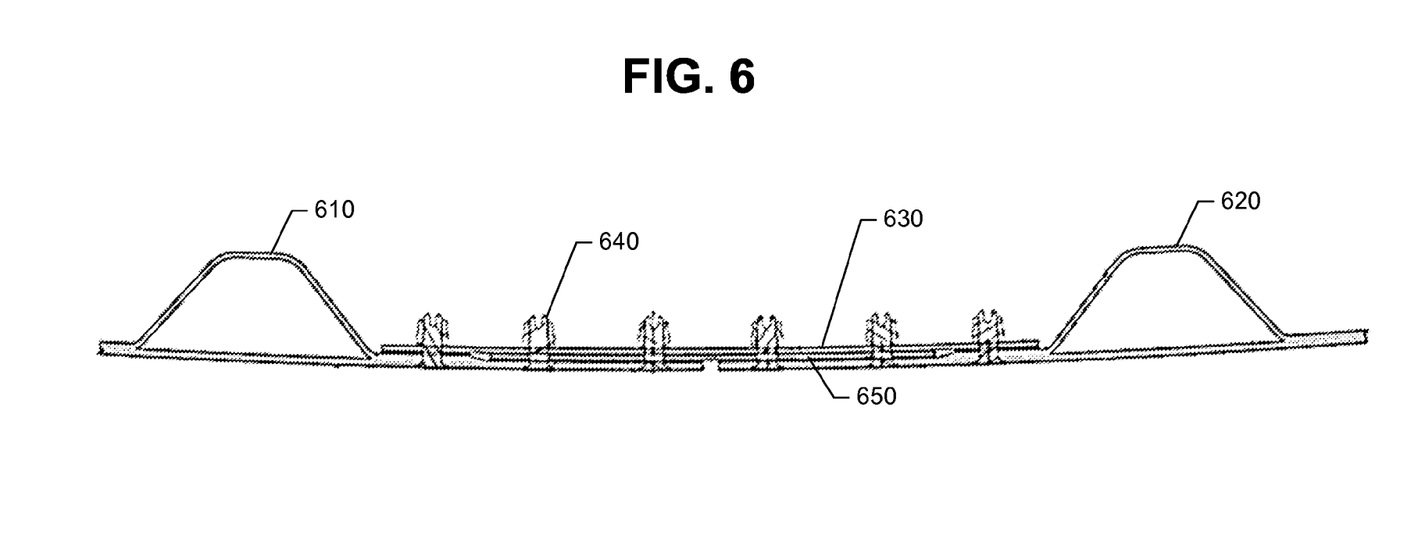
FIG. 6 is an illustration of a replacement panel that is attached to a skin panel via a bolted splice.

Reference is made to FIG. 6, which illustrates a replacement panel 610 that is attached to a skin panel 620 via a bolted splice. The bolted splice includes a doubler 630 that is attached to both the replacement panel 610 and the skin panel 620 by bolts 640. Non-structural filler 650 may be used to fill gaps between the doubler 630 and the replacement panel 610 or skin panel 620. The splices generally have circumferential, longitudinal, and corner configurations.

Replacement panels may vary in size. Replacement panels may range from approximately 3'×3' to upwards of approximately 42'×20'.

Reference is now made to FIG. 7, which illustrates a method of using the fabrication cell to create a custom one-piece replacement panel. At block 710, a design of a customized composite replacement panel for replacing the damaged area of the composite component is received. The design includes a detail panel definition for skin and integrated stiffening substructure. This may include creating a detail panel definition based on skin and substructure that were originally used in the section, and modifying the original panel definition so the replacement panel can fit in the opening and match the contour of the component. Creating the panel definition includes creating an engineering geometry including ply boundaries, stacking sequence, fiber composition and orientations, and tape widths within each boundary.

In some embodiments, the detail panel definition specifies a one-piece replacement panel. That is, all underlying stiffening structure is co-cured with the skin. In other embodiments, the detail panel definition does not specify a one-piece replacement panel, but rather a hybrid that includes custom-made integrated skin and stiffening substructure along with other elements.

The design also includes a detail panel definition for mechanical fastening elements (e.g., splice doublers and fillers), which will be used to mechanically fasten the replacement panel to the component. Since the exact location of the damaged material and the exact extent of the damage is random and unpredictable, the splice joint configuration and details for the repair are likely not to exist and need to be created. The number of detail panels depends on size and complexity of the repair. In a complex repair, for instance, dozens of splice doublers and thousands of fasteners might be involved. This phase of design is unique to the damage.

The design may also include a panel assembly definition and an installation definition. These definitions describe how to attach the replacement panel to the component using the fastening elements (e.g., splice doublers, fillers, and fasteners).

At block 720, the replacement panel is fabricated according to the design at a fabrication cell. In some embodiments, the various elements (e.g., skin and stiffeners) are co-cured as is done in production. In other embodiments, some of the elements of the replacement panel may be mechanically fastened together (e.g., excised stringers bolted together and to the skin). However, co-curing is preferable, especially if the co-cured panel matches the existing configuration.

Additional cutting may be performed after the replacement panel has been fabricated. For instance, additional cutting may be performed if the replacement panel is larger than the opening. Additional trimming may be performed to ensure that engineering gap tolerances are met. This final fit up, which ensures that engineering gap tolerances are met, may be done at the repair site. The replacement panels may intentionally have usable excess which is trimmed at the repair site.

At block 730, the replacement panel is shipped to the repair site, where it is installed into the opening. The installation may include mechanically fastening the replacement panel to the component. For instance, numerous splice doublers (composite and/or titanium), fillers, and brackets may be used to fasten the replacement panel to the section.

Conventional composite and metallic (e.g., titanium) fabrication techniques may be used to fabricate splice doublers and other elements for fastening the replacement panel. In some embodiments, titanium fastening alone, or composite elements alone, or a combination of titanium and composite fastening elements may be used. The elements made of titanium may be fabricating by conventional titanium fabrication processes such as hot forming and machining. The composite fastening elements may be fabricated by conventional composite prepreg fabrication techniques such as hand layup, bag, cure, trim and non-destructive ultrasonic inspection. Automated Fiber Placement (AFP) may be used instead of hand layup where permitted by engineering. In some embodiments, composite doublers, fillers, and splices could be built using the same production site following the same or similar processes as the replacement panel.

Thus, the fabrication cell and method of FIG. 7 may be used to repair a new class of commercial aircraft having one or more one-piece composite components. A damaged one-piece section is repaired quickly (much faster than replacing an entire section), which allows the aircraft to be returned to service quickly. Consequently, aircraft down time is reduced.

An advantage of the production cell is that it may be located remotely from the aircraft manufacturer's main production facility. For instance, a fabrication cell may be located closer to an airport or other location where aircraft will be repaired. The closer location saves significant logistics costs (e.g., packaging, transportation) and reduces flow time. This further reduces down time.

Fabricating the mandrel tool and using it at the same site also saves significant logistics costs and reduces flow time. In contrast, building the layup mandrel tool at one site and using it at another site may involve extra steps, such as shipping the mandrel tool to the build site, and unpacking the tool and setting up the tool at the build site.

The invention claimed is:

1. A fabrication cell comprising:
a clean section dedicated to laying up reinforcing fibers on a mandrel tool;
an adjacent dirty section dedicated to machining the layup after curing;
a plurality of interchangeable end effectors at the clean and dirty sections; and
a common end effector positioning system, movable between the clean and dirty sections, for using the plurality of interchangeable end effectors to perform the fiber layup and the machining at the clean and dirty sections.

2. The fabrication cell of claim 1, wherein the clean and dirty sections include end effector work stations for storing the interchangeable end effectors.

3. The fabrication cell of claim 1, further comprising:
means for preventing contaminants in the dirty section from entering the clean section.

4. The fabrication cell of claim 1, further comprising a means for moving the mandrel tool between the clean and dirty sections.

5. The fabrication cell of claim 1, wherein the end effector positioning system includes a gantry.

6. The fabrication cell of claim 1, further comprising means for maintaining temperature, humidity, and particle count in the clean section to satisfy composite material process requirements.

7. The fabrication cell of claim 1, wherein the dirty section includes machining end effectors; and wherein the clean section includes layup and material cutting end effectors.

8. The fabrication cell of claim 1, further comprising nondestructive inspection end effectors useable by the end effector positioning system.

9. The fabrication cell of claim 1, wherein the dirty section further includes end effectors for fabricating the mandrel tool.

10. The fabrication cell of claim 1, further comprising end effectors for fabricating splice doublers and fillers on the mandrel tool.

11. The fabrication cell of claim 1, further comprising a curing section, adjacent the clean section, for curing.

12. The fabrication cell of claim 1, further comprising a common controller for controlling the end effector positioning system and selected end effectors in both the clean and dirty sections.

13. A method of using the fabrication cell of claim 1, the method comprising:
using the common end effector positioning system to build the mandrel tool in the dirty section;
moving the mandrel tool and the common end effector positioning system into the clean section;
using the common end effector positioning system to lay up the reinforcing fibers on the mandrel tool;
moving the mandrel tool to a curing section to produce a cured part;
moving the mandrel tool and the common end effector positioning system back into the dirty section; and
using the common end effector positioning system to machine the cured part on the mandrel tool.

14. The method of claim 13, further comprising cleaning the common end effector positioning system before it is moved into the clean section.

15. A fabrication cell comprising:
a clean section including interchangeable end effectors for performing composite layup operations, the clean section satisfying clean room requirements for processing uncured composite materials;
a dirty section adjacent the clean section, the dirty section including interchangeable end effectors for performing machining operations; and
an end effector positioning system, movable between the clean and dirty sections, for selecting and using the end effectors to perform the layup operations in the clean section and the machining operations in the dirty section.

16. The fabrication cell of claim 15, further comprising means for preventing contaminants in the dirty section from entering the clean section.

17. The fabrication cell of claim 15, further comprising means for moving the end effector positioning system between the clean and dirty sections.

18. The fabrication cell of claim 15, further comprising means for maintaining temperature, humidity, and particle count in the clean section to satisfy the composite material process requirements.

19. The fabrication cell of claim 15, further comprising a common controller for controlling the end effector positioning system and selected end effectors in both the clean and dirty sections.

* * * * *